No. 815,657. PATENTED MAR. 20, 1906.
A. SWASEY.
PANORAMA SIGHT.
APPLICATION FILED APR. 12, 1905.

2 SHEETS—SHEET 1.

Witnesses.
E. B. Gilchrist
N. L. Brennan

Inventor:
Ambrose Swasey,
By his Attorneys,
Thurston & Bates.

No. 815,657. PATENTED MAR. 20, 1906.
A. SWASEY.
PANORAMA SIGHT.
APPLICATION FILED APR. 12, 1905.

2 SHEETS—SHEET 2.

Witnesses.
E. B. Gilchrist
N. L. Brennan

Inventor.
Ambrose Swasey,
By his Attorneys,
Thurston & Bates.

UNITED STATES PATENT OFFICE.

AMBROSE SWASEY, OF CLEVELAND, OHIO, ASSIGNOR TO THE WARNER & SWASEY COMPANY, OF CLEVELAND, OHIO, A CORPORATION OF OHIO.

PANORAMA-SIGHT.

No. 815,657.　　　　　Specification of Letters Patent.　　Patented March 20, 1906.

Application filed April 12, 1905. Serial No. 255,169.

*To all whom it may concern:*

Be it known that I, AMBROSE SWASEY, a citizen of the United States, residing at Cleveland, in the county of Cuyahoga and State of Ohio, have invented a certain new and useful Improvement in Panorama-Sights, of which the following is a full, clear, and exact description, reference being had to the accompanying drawings.

This invention is an adaptation of a well-known optical principle especially useful as a terrestrial telescope or as a telescopic gun-sight, by which an observer located behind a protecting wall or parapet may obtain a telescopic view in all directions similar to the camera obscura, only without changing his position. The instrument includes, essentially, a horizontal tube provided with the usual telescopic eyepiece, a vertical tube containing the telescopic objective lens and long enough to extend above said wall, and a horizontal tube secured upon the outer end of the vertical tube and adapted to turn about the axis thereof, there being reflectors, either mirrors or reflecting prisms, at the outer angles where said vertical tube and horizontal tubes, respectively, join one another. In such an instrument a combined reflecting and refracting prism is placed in the vertical member for the purpose of inverting the image, whereby when the image is again inverted by the objective lens it will appear right side up at the eyepiece.

This invention resides particularly in the mechanical construction and combination of a system of sun and planet and internal gearing, whereby in conformance with the well-known principles by which the panoramic image is kept right side up at the eyepiece when the upper horizontal member is turned in either direction about the vertical axis the said combined reflecting and refracting prism will be turned in the same direction, but at half the angular speed.

Figure 1:
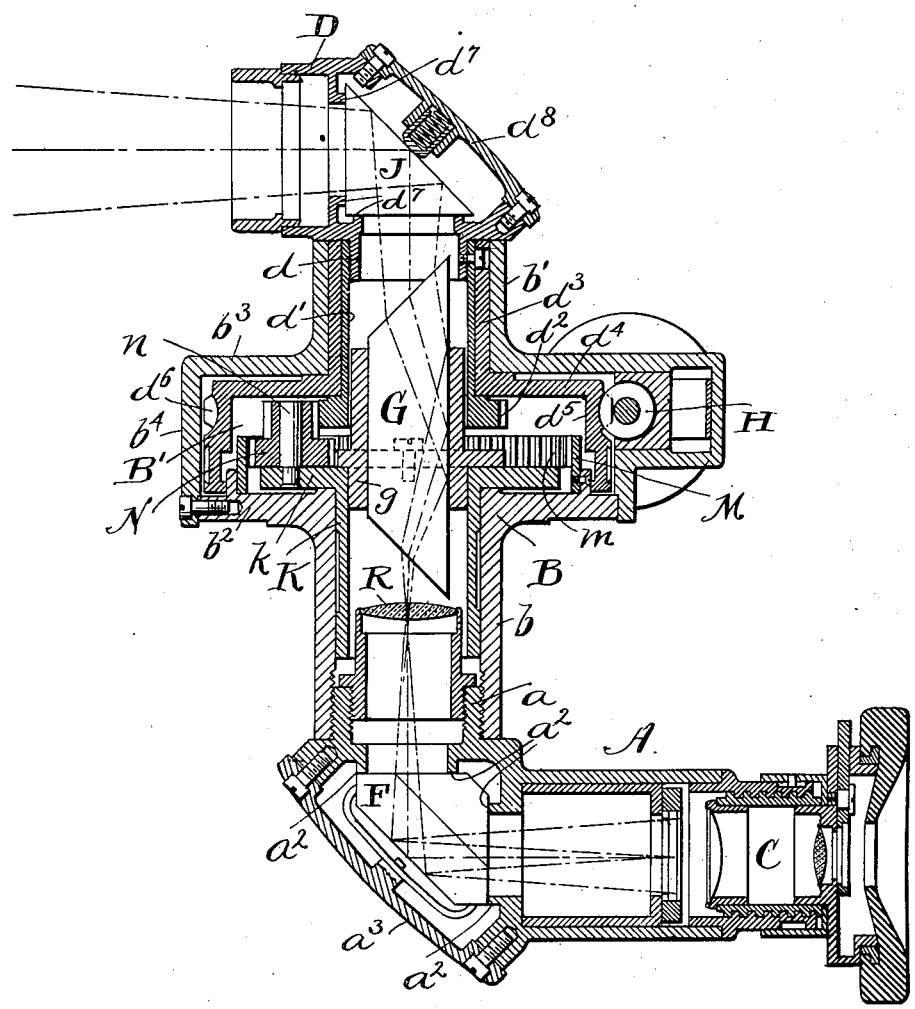
Figure 2:
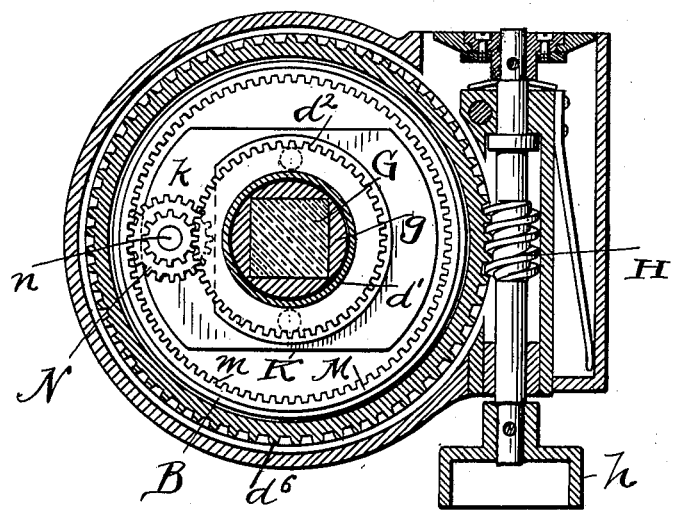
Figure 3:
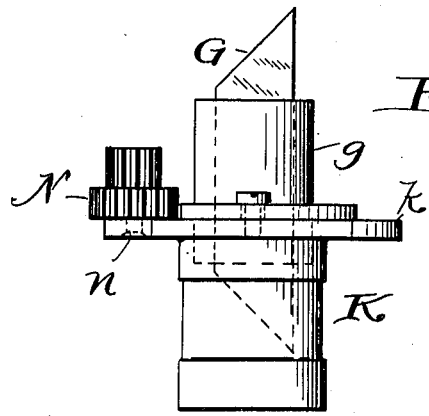

In the accompanying drawings, illustrating my invention, Figure 1 is a vertical transverse section. Fig. 2 is a horizontal transverse section. Fig. 3 is a side elevation of a detail.

Referring to the parts by letters, A represents the lower horizontal tube which carries the eyepiece C.

B represents the vertical tube, which is rigidly fixed to the member A, and in its lower end the objective lens R is secured.

D represents the upper horizontal tube, which is supported upon the vertical tube and is adapted to turn about the axis of said vertical tube. The inner end of the member A has a vertical tubular projection $a$, and the outer angle at which this tubular projection joins the tube A is cut away to permit the insertion of a reflecting-prism F. This prism is fitted to seats $a^2$ and is held in place by a cap $a^3$, which is secured over the opening through which said prism is inserted. The lower end of the vertical tube B screws onto this extension $a$. The vertical tube B is made of two parts $b$ and $b'$. At the upper end of the part $b$ is a laterally-extended flange $b^2$. On the lower end of the part $b'$ is a laterally-extended flange $b^3$, having a depending flange $b^4$ at its outer edge. The flange $b^4$ being secured to the flange $b^2$ forms with it an annular box B' for the reception and accommodation of certain operating mechanism to be described. The upper tube D has a depending tubular projection $d$, which screws into a tube $d'$, which latter tube has at its lower end an outwardly-extending horizontal flange provided with gear-teeth $d^2$. This tube $d'$ is fitted within and secured to a tube $d^3$, which is rotatably mounted within the section $b'$ and is provided at its lower end with an outwardly-extending horizontal flange $d^4$, from which depends a vertical cylindrical flange $d^5$, the parts $d^4$ and $d^5$ being within the box B'. On the periphery of the flange $d^3$ are worm-wheel teeth $d^6$, which are engaged by worm H, mounted in said box and having an operating-knob $h$ on its projecting end. The outer angle of the part of the tube D where it joins with the depending tube $d$ is cut away to permit the insertion of a reflecting-prism J, which is fitted to seats $d^7$ and is held in place by a cap $d^8$, secured over the opening through which said prism is inserted.

G represents a reflecting and refracting prism which is rectangular in transverse horizontal section. Its upper and lower faces, however, lie at an angle of ninety degrees to each other. This prism is fitted into a prism-holder $g$, which is fixed to the upper end of a tube K. This latter tube K is rotatably mounted in the lower member $b$ of the tube B, and it has at its upper end a laterally-extended flange $k$, which projects up into the box B'. A ring M is rigidly fastened in the box B' beyond the edge of the flange $k$ and is provided with internal gear-teeth $m$. Secured to the flange $k$ is a vertical stud $n$, on which is mounted a double pinion N, whose upper and smaller portion meshes with the gear-teeth $d^2$, and while the lower and larger portion meshes with the gear-teeth $m$.

By the above arrangement whenever the worm H is operated to turn the member D through the medium of the rigidly-secured tubes $d^3$ $d'$ $d$ this turning motion is communicated to the pinion N, which being resisted by the immovable ring M is converted into a forward movement. The traveling pinion, being mounted on the tube K, supporting the prism G, causes these parts to revolve, and the rate of revolution is obviously dependent on the ratio existing between the gears $d^2$, the gears $m$, and the teeth on the double pinion N. I so arrange these that, as above indicated, the rotation of the prism G takes place at half the angular velocity of that of the tube D.

Having described my invention, I claim—

1. The combination of a vertical tubular member B, a horizontal tubular member A secured to its lower end, a reflector F at the junction of said tubular members, a tubular member $d^3$ rotatably mounted in the upper end of the member B, a horizontal tubular member D secured to the projecting upper end of the rotatable member $d^3$, a reflector J at the junction of said tubular members, a prism-carrier rotatably mounted in the member B, and a prism G secured therein, with a concentric internal gear fixed to member B, a concentric external gear fixed to the member $d^3$, a double pinion N rotatably mounted on a vertical axis carried by the prism-carrier and parallel with the axis of the member B, the said double prism N having its larger part in mesh with said internal gear and its smaller part in mesh with said external gear, and means for turning the member $d^3$ relative to the member B.

2. The combination of a vertical tubular member having an enlarged box between its ends, a telescopic objective lens secured in said vertical member, a horizontal tubular member secured to the lower end of said vertical tube and containing the telescopic eyepiece, and a reflecting-prism in the outer angle where said two members join, with a horizontal tubular member upon the upper end of the vertical member and having a depending tube which is rotatably mounted in the vertical member and has an external gear on its lower end, a fixed internal gear in said box, the two connected by a planet-gear which revolves the prism-carrier mounted in the vertical tube at half the angular speed of the upper horizontal member, a reflecting and refracting prism carried thereby, a flange rigid with said carrier and projecting into said box, a vertical spindle secured to said flange, a double pinion mounted upon said spindle and engaging with the internal and external gears herein mentioned.

In testimony whereof I hereunto affix my signature in the presence of two witnesses.

AMBROSE SWASEY.

Witnesses:
F. H. RICE,
EDW. L. FRANTZ.